United States Patent
Bae et al.

(10) Patent No.: US 9,370,886 B2
(45) Date of Patent: Jun. 21, 2016

(54) RADIATOR FRAME HAVING ANTENNA PATTERN EMBEDDED THEREIN, ELECTRONIC DEVICE INCLUDING THE SAME, AND MOLD FOR MANUFACTURING THE SAME

(71) Applicant: SAMSUNG ELECTRO-MECHANICS CO., LTD., Suwon, Gyunggi-do (KR)

(72) Inventors: Sang Woo Bae, Gyunggi-do (KR); Dae Ki Lim, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 196 days.

(21) Appl. No.: 14/039,560

(22) Filed: Sep. 27, 2013

(65) Prior Publication Data

US 2014/0168016 A1    Jun. 19, 2014

(30) Foreign Application Priority Data

Dec. 14, 2012  (KR) ......................... 10-2012-0146589

(51) Int. Cl.
*H01Q 1/24* (2006.01)
*B29C 45/14* (2006.01)
(Continued)

(52) U.S. Cl.
CPC ..... *B29C 45/14073* (2013.01); *B29C 45/14639* (2013.01); *B29C 45/14778* (2013.01);
(Continued)

(58) Field of Classification Search
CPC ... H01Q 1/243; H01Q 9/0407; H01Q 9/0421; H01Q 5/371
USPC .......................................... 343/702, 700 MS
See application file for complete search history.

(56) References Cited

U.S. PATENT DOCUMENTS 8,068,067 B2 * 11/2011 Hong ................... H01Q 1/1207
                                                          343/702
8,773,314 B2 *  7/2014 Hong .................. B29C 45/1671
                                                          343/702
2010/0271272 A1  10/2010 Sung et al.
(Continued)

FOREIGN PATENT DOCUMENTS

CN         102170041 A    8/2011
KR   10-2010-0090574 A    8/2010
(Continued)

OTHER PUBLICATIONS

Chinese Office Action issued on Jun. 26, 2015 in counterpart Chinese Application No. 201310689400.3 (16 pages with English translation).

*Primary Examiner* — Hoang V Nguyen
(74) *Attorney, Agent, or Firm* — NSIP Law

(57) ABSTRACT

A radiator frame having an antenna pattern embedded therein, an electronic device including the same, and a mold for manufacturing thereof. The radiator frame includes a radiator including an antenna pattern part transmitting or receiving a signal and a terminal connection portion electrically connecting the antenna pattern part and a circuit substrate, and a molded frame formed by injection-molding a material to incorporate the radiator so that the terminal connection portion is exposed at a first surface of the molded frame and the antenna pattern part is exposed at a second surface of the molded frame opposite to the first surface, wherein the antenna pattern part includes one or more supporting holes arranged to fix the antenna pattern part to an injection-molding mold, and the supporting holes are at least partially filled with the molded frame material extending from the second surface of the molded frame.

6 Claims, 11 Drawing Sheets

(51) Int. Cl.
*H01Q 9/04* (2006.01)
*H01Q 5/371* (2015.01)
*B29L 31/34* (2006.01)

(52) U.S. Cl.
CPC ............... *H01Q1/243* (2013.01); *H01Q 5/371* (2015.01); *H01Q 9/0421* (2013.01); *B29C 2045/14081* (2013.01); *B29C 2045/14163* (2013.01); *B29L 2031/3456* (2013.01); *B29L 2031/3481* (2013.01)

(56) References Cited

U.S. PATENT DOCUMENTS

2011/0205127 A1  8/2011  Hong et al.
2011/0205141 A1  8/2011  Hong et al.

FOREIGN PATENT DOCUMENTS

| KR | 2010-0117012 A | 11/2010 |
| KR | 2011-0097415 A | 8/2011 |
| KR | 10-2012-0000471 A | 1/2012 |

* cited by examiner

RADIATOR FRAME HAVING ANTENNA PATTERN EMBEDDED THEREIN, ELECTRONIC DEVICE INCLUDING THE SAME, AND MOLD FOR MANUFACTURING THE SAME

CROSS-REFERENCE TO RELATED APPLICATION

This application claims the benefit of Korean Patent Application No. 10-2012-0146589 filed on Dec. 14, 2012, with the Korean Intellectual Property Office, the disclosure of which is incorporated herein by reference.

BACKGROUND OF THE INVENTION

1. Field of the Invention

The present invention relates to a radiator frame having an antenna pattern embedded therein, an electronic device including the same, and a mold for manufacturing the same.

2. Description of the Related Art

Mobile communications terminals, for example, cellular phones, PDAs, navigation devices, notebook computers, and the like, supporting wireless communications, are necessities in modern society. Mobile communications terminals use various communications schemes, such as CDMA, wireless LAN, GSM, DMB, or the like. One of the most important elements of mobile communications terminals that enable these functions is an antenna.

Antennas currently used in mobile communications terminals have evolved from exterior type antennas, such as rod antennas and helical antennas, to an interior type antenna mounted within the terminal.

There have been problems, in that the exterior type antenna may be vulnerable to external impacts, while the interior type antenna increases the volume of the terminal itself.

In order to solve these problems, research into integrating the antenna with the mobile communications terminal has been actively conducted.

According to the related art, a method in which a radiator frame is formed by injection-molding a radiator and the radiator is embedded within a case of an electronic device by reinjecting the radiator frame has been used.

In order for the radiator to be accurately embedded in the case of the electronic device, a unit for fixing the radiator to a mold needs to be provided. However, according to the related art, the radiator has typically been fixed to the mold by a pin or the like provided in the mold by providing holes to the radiator. However, in the above-mentioned method, the holes or the like are formed in the radiator frame, such that the radiator frame may not be used for replacing the case.

The following related art document discloses a case structure of an electronic device formed by providing holes or the like in the radiator, fixing the radiator in the mold using the pin or the like, and then injection-molding the radiator.

RELATED ART DOCUMENT

Korean Patent Laid-Open Publication No. 10-2011-0097415

SUMMARY OF THE INVENTION

An aspect of the present invention provides a mold for manufacturing a radiator frame, allowing a guide hole provided in a radiator to be filled with molding resin.

In addition, another aspect of the present invention is to ultimately fill the guide hole included in the radiator with the molding resin, such that unintended holes other than holes included in the radiator frame itself for a particular purpose are not formed.

According to an aspect of the present invention, there is provided a radiator frame, including: a radiator including an antenna pattern part transmitting or receiving a signal and a terminal connection portion electrically connecting the antenna pattern part and a circuit substrate; and a molded frame formed by injection-molding the radiator so that the terminal connection portion is exposed at a first surface of the molded frame and the antenna pattern part is exposed at a second surface of the molded frame opposite to the first surface, wherein the antenna pattern part includes one or more supporting holes arranged to fix the antenna pattern part to an injection-molding mold, and the supporting holes are at least partially filled with the molded frame material extending from the second surface of the molded frame.

The other surface of the molded frame may be provided with at least one supporting groove in a position corresponding to a position in which the antenna pattern part is provided.

The supporting holes may be filled with the molded frame material.

A portion of the radiator frame simultaneously having the antenna pattern part and the molded frame may form a structure filled with at least one of the antenna pattern part and the molded frame in a thickness direction.

The antenna pattern part and the molded frame may be further provided with a film formed by performing a coating or a painting process, or attaching a film or a coating paper in a direction to which the antenna pattern part is exposed.

According to an aspect of the present invention, there is provided an electronic device, including: a case of the electronic device; the radiator frame described above, mounted in the case of the electronic device; and a circuit substrate electrically connected to the terminal connection portion to receive a signal from or transmit a signal to the radiator.

According to an aspect of the present invention, there is provided a mold for manufacturing a radiator frame, including: an upper mold receiving therein, a radiator in which an antenna pattern part receiving an external signal and including one or more supporting holes and a terminal connection portion disposed on a different plane from the antenna pattern part are formed; a lower mold combined with the upper mold to thereby form an internal space receiving the radiator; a resin material injection part provided with at least one of the upper mold and the lower mold so that a resin material is introduced into the internal space; and a guide pin provided in the lower mold so that one end thereof is fitted into the supporting hole and the antenna pattern part is adhered to an internal surface of the upper mold, wherein the guide pin is provided so as to be interworked with an elastic pushing unit to be retractable by a spray pressure of the resin material introduced into the internal space.

The elastic pushing unit may include: an elastic unit having one end attached to the other end of the guide pin; a supporting unit supporting the other end of the elastic unit; and a guide hole provided in the lower mold so that the guide pin is inserted thereinto and one end thereof is exposed to the internal space.

The elastic unit may be a spring.

The elastic unit may be an elastic plate having a cantilever form having one end fixed to a predetermined position.

The guide pin may be provided in an amount of at least two, and the at least two guide pins may share the elastic plate attached to the other end thereof.

The mold for manufacturing the radiator frame may further include a dummy guide pin disposed so as to be adjacent to the resin material injection part rather than to the guide pin, and the dummy guide pin may be connected to the guide pin.

The lower mold may be provided with a dummy guide hole provided so that the dummy guide pin is inserted thereinto and one end thereof is exposed to the internal space.

The elastic unit may be a spring, and the other end of the dummy guide pin may be connected to the other end of the guide pin by an auxiliary plate.

The guide pin may be provided in an amount of at least two, and the other ends of the at least two guide pins may be connected to each other by the auxiliary plate.

The elastic unit may be an elastic plate having a cantilever form having one end fixed to a predetermined position, and the other end of the dummy guide pin may be connected to the elastic plate.

The guide pin may be provided in an amount of at least two, and the other ends of the at least two guide pins may share the elastic plate.

The lower mold may be provided with at least one supporting pin protruded into the internal space.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
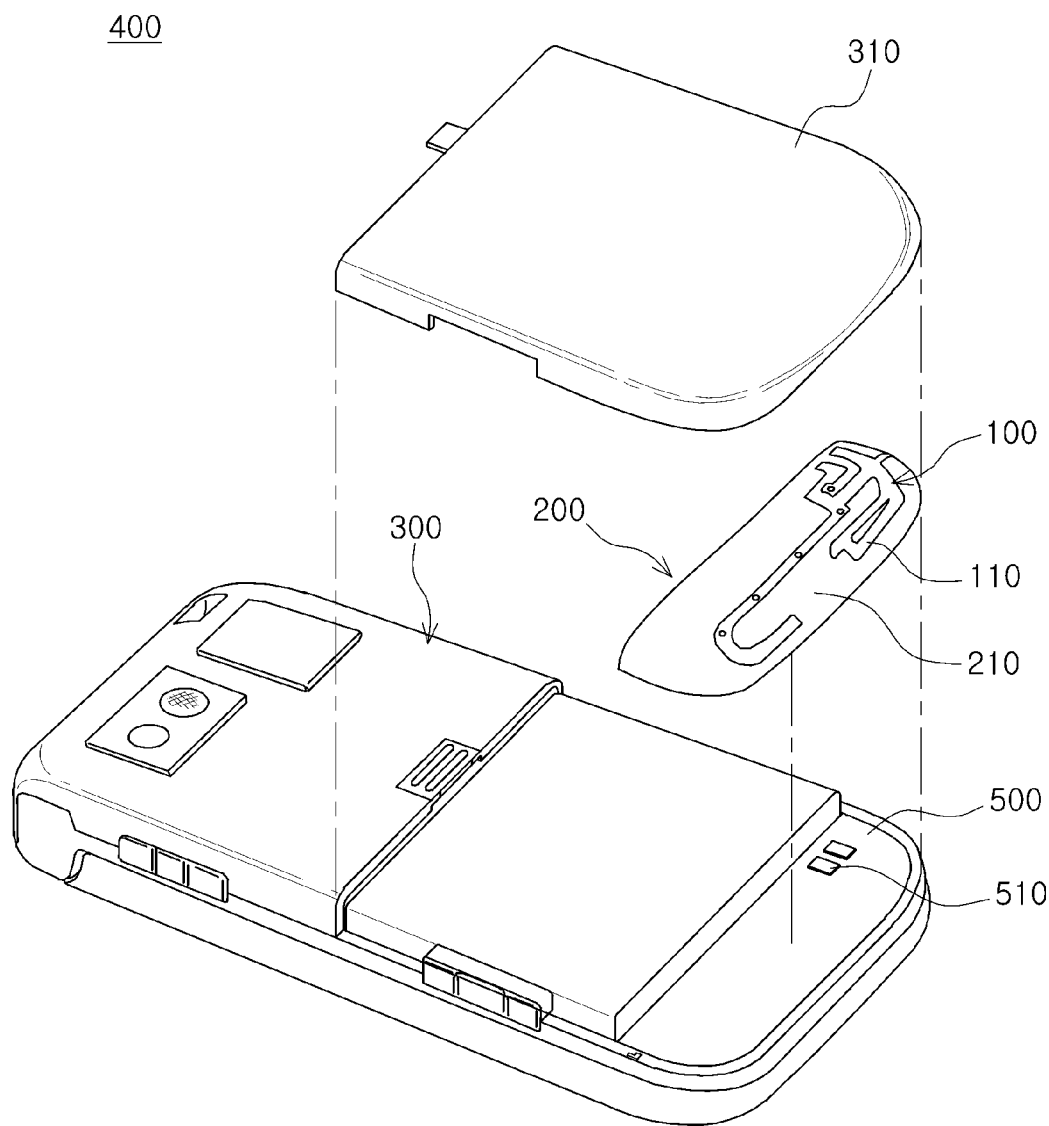
FIG. 1 is a perspective view schematically illustrating a form in which a radiator frame is coupled to a case of a mobile communications terminal, an electronic device, according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
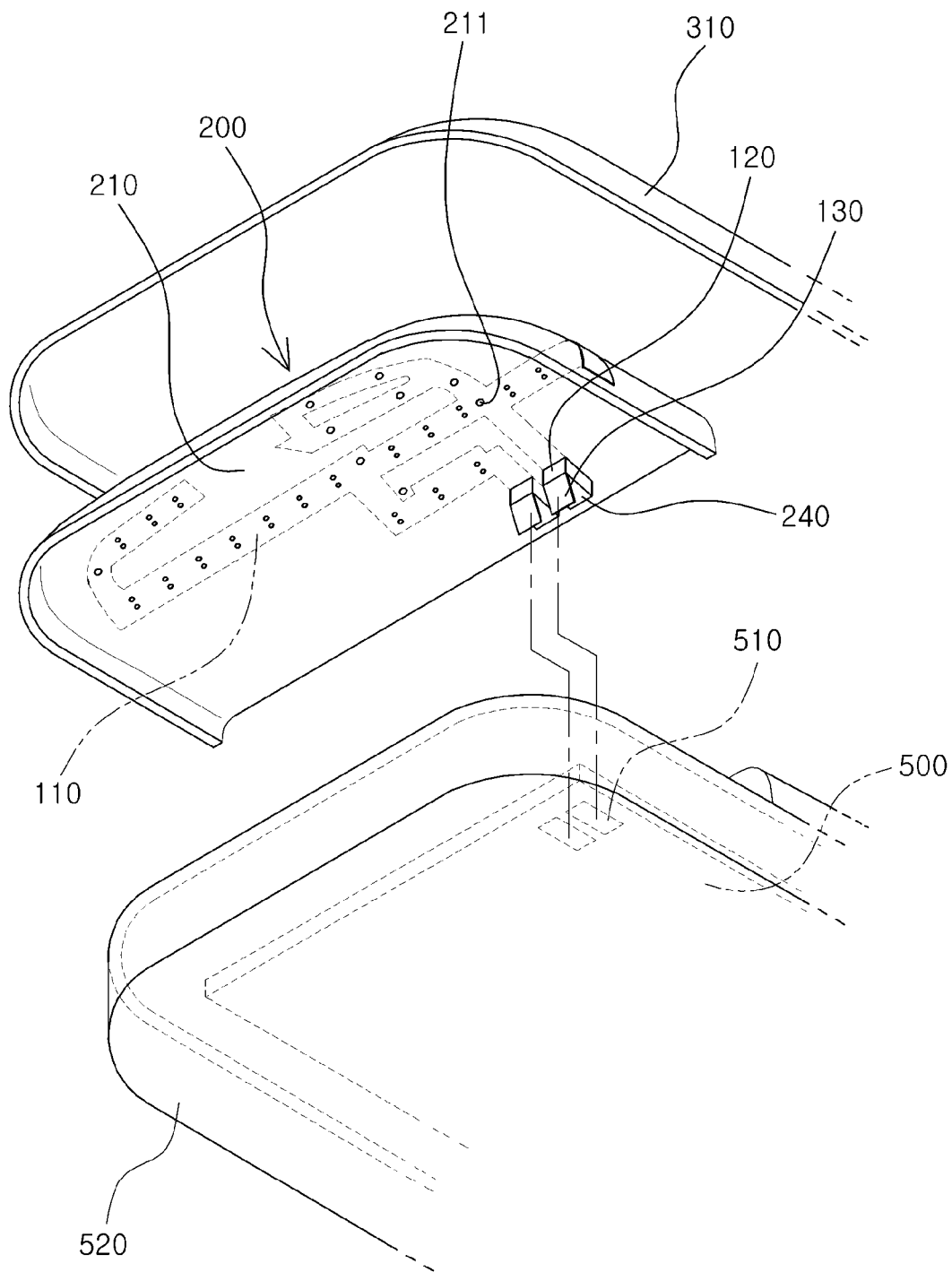
FIG. 2 is a perspective view schematically illustrating an exploded form of the mobile communications terminal manufactured using the radiator frame according to an embodiment of the present invention.

FIG. 1 is a perspective view schematically illustrating a form in which a radiator frame is coupled to a case of a mobile communications terminal which is an electronic device, according to an embodiment of the present invention and FIG. 2 is a perspective view schematically illustrating an exploded form of the mobile communications terminal manufactured using the radiator frame according to an embodiment of the present invention.

Referring to FIGS. 1 and 2, the mobile communications terminal 400, the electronic device according to the embodiment of the present invention, may include a case 300 forming an exterior thereof and a battery cover 310 covering a battery mounting part and a radiator frame 200. The radiator frame 200 may be formed by embedding an antenna pattern part 110 in a molded frame 210.

Here, a radiator 100 may include a terminal connection portion 130 for connection to a terminal 510 of a circuit substrate 500, and the radiator frame 200 mounted on the electronic device 400 may implement an antenna function in the mobile communications terminal 400 by connecting the terminal connection portion 130 to the terminal 510 of the circuit substrate 500.

Here, the terminal connection portion 130 may be in elastic contact with the terminal 510 in order to secure connection reliability with the terminal 510.

Meanwhile, when an antenna pattern part 110 is mounted on the electronic device such as the mobile communications terminal 400, the antenna pattern part 110 may be externally exposed in a case in which the battery cover 310 is not covered. Therefore, the antenna pattern part 110 and the molded frame 210 on one surface on which the antenna pattern part 110 is exposed from the radiator frame 200 may be provided with a protective film (not shown).

That is, the radiator frame 200 is mounted on the electronic device such as the mobile communications terminal 400, wherein an external surface of the radiator frame 200 may be additionally covered with a film or the like. More specifically, one surface on which the antenna pattern part 110 is externally exposed from the radiator frame 200 may be additionally covered with the film. In a state in which the battery cover 310 is covered, since the radiator frame 200 is not externally exposed, there is no problem. However, in the case in which the battery cover 310 is opened in order to exchange a battery or the like, since the radiator frame 200 is externally exposed, the film is provided in order to consider an aesthetic appearance in this case. For example, the film may be formed immediately by spraying a liquid for coating, painting, or the like, or may be simply formed by attaching ready-made article such as the film, the coating, or the like.

Figure 3:
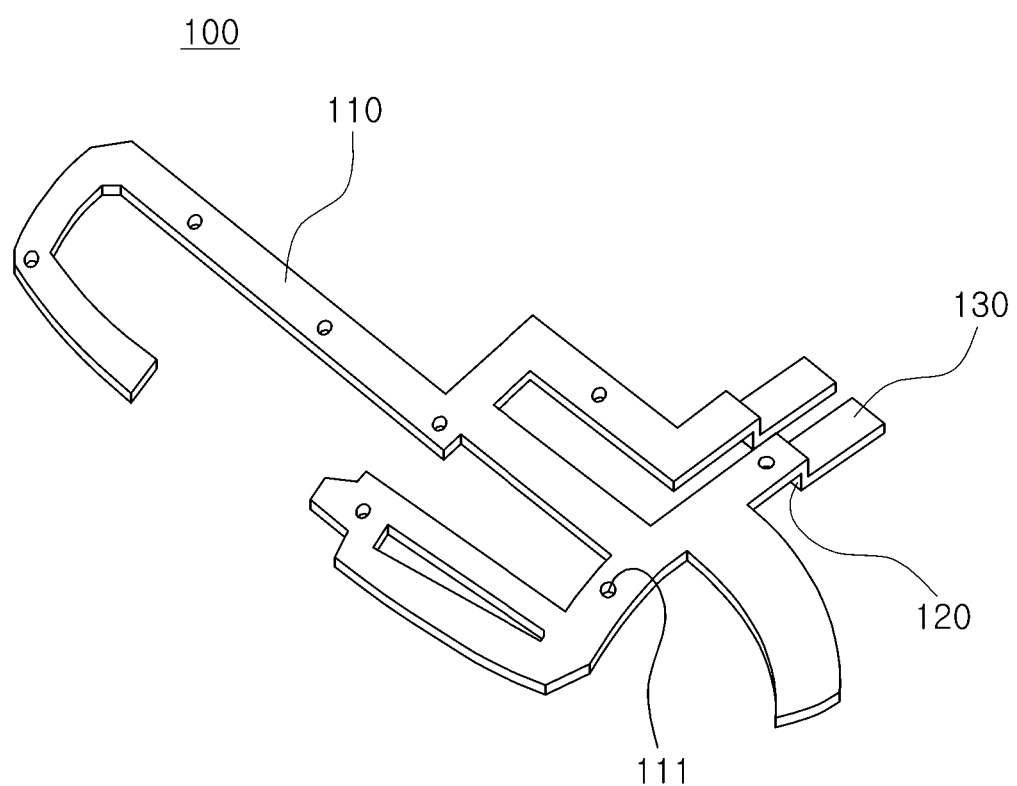
FIG. 3 is a perspective view schematically illustrating a radiator provided with the radiator frame according to an embodiment of the present invention.

Radiator Frame, Mold for Manufacturing Thereof, and Method of Manufacturing Thereof FIG. 3 is a perspective view schematically illustrating a radiator provided with the radiator frame according to an embodiment of the present invention.

The radiator frame 200 may be manufactured by injection-molding the radiator 100, and the radiator 100 provided on the radiator frame 200 may include the antenna pattern part 110 for transmitting or receiving a signal and the terminal connection portion 130 for transmitting or receiving the signal to or from the circuit substrate 500 of the electronic device.

Referring to FIG. 3, the radiator 100 provided on the radiator frame 200 according to the embodiment of the present invention may include the antenna pattern part 110, the connection part 120, and the terminal connection portion 130.

The radiator 100 may be configured of a conductor formed of, for example, aluminum, copper, or the like, and may receive an external signal and transfer the received external signal to a signal processing device of the electronic device such as the mobile communications terminal 400. In addition, the radiator 100 may include the antenna pattern part 110 forming a meander line for receiving an external signal within various bands.

The radiator 100 may include the antenna pattern part 110 receiving the external signal and the terminal connection portion 130, in contact with the circuit substrate 500 of the electronic device in order to transmit the external signal to the electronic device.

In addition, the radiator 100 may be formed as a three-dimensional structure by respectively bending the antenna pattern part 110 and the terminal connection portion 130, and the antenna pattern part 110 and the terminal connection portion 130 may be connected to each other by the connection part 120. The connection part 120 may connect the antenna pattern part 110 and the terminal connection portion 130 so that the antenna pattern part 110 is formed on one surface of the molded frame 210 and the terminal connection portion 130 is formed on the other surface of the molded frame 210.

The antenna pattern part 110 may include one or more supporting holes 111. The supporting holes 111 are provided to fix the antenna pattern part 110 to the mold for manufacturing the radiator frame. That is, the mold for manufacturing the radiator frame may be provided with guide pins 663 or 673 fitted into the supporting holes 111. A description thereof will be provided in detail in describing the mold for manufacturing the radiator frame.

The connection part 120 may allow the antenna pattern part 110 and the terminal connection portion 130 to be configured on different planes and may allow the terminal connection portion 130, not embedded in the radiator frame 200, to be exposed to a surface opposite to one surface having the antenna pattern part 110 formed thereon.

Here, the terminal connection portion 130 may transmit the signal received from the antenna pattern part 110 to the circuit substrate 500 of the electronic device and may be in elastic contact with the terminal 510 of the circuit substrate 500 in order to secure reliability of signal transmission.

Therefore, the terminal connection portion 130 may have a configuration for securing elastic force added thereto. That is, in order to perform the injection-molding of the radiator frame 200 having the antenna pattern part 110 embedded therein and then provide elasticity to the terminal connection portion 130, the terminal connection portion 130 is bent by applying external force thereto. In this case, the elastic force of the terminal connection portion 130 may be secured by forming a reinforcing part (not shown) such as a reinforcement emboss formed by applying pressure from one surface to the other surface at a boundary between the connection part 120 and the terminal connection portion 130.

In addition, by the reinforcing part (not shown), the boundary between the connection part 120 and the terminal connection portion 130 may be further reinforced and may prevent the terminal connection portion 130 from being damaged by external impacts.

Here, the reinforcing part (not shown) may be a reinforcement bead protrudedly formed at the boundary between the connection part 120 and the terminal connection portion 130, or may form the boundary between the connection part 120 and the terminal connection portion 130 in a rounded manner.

However, the reinforcing part (not shown) is not limited to the above-mentioned reinforcement bead or the boundary formed in a rounded manner, but may be changed as long as it may secure elastic force in the terminal connection portion 130 and prevent damage to the terminal connection portion 130 due to the external force.

Figure 4:
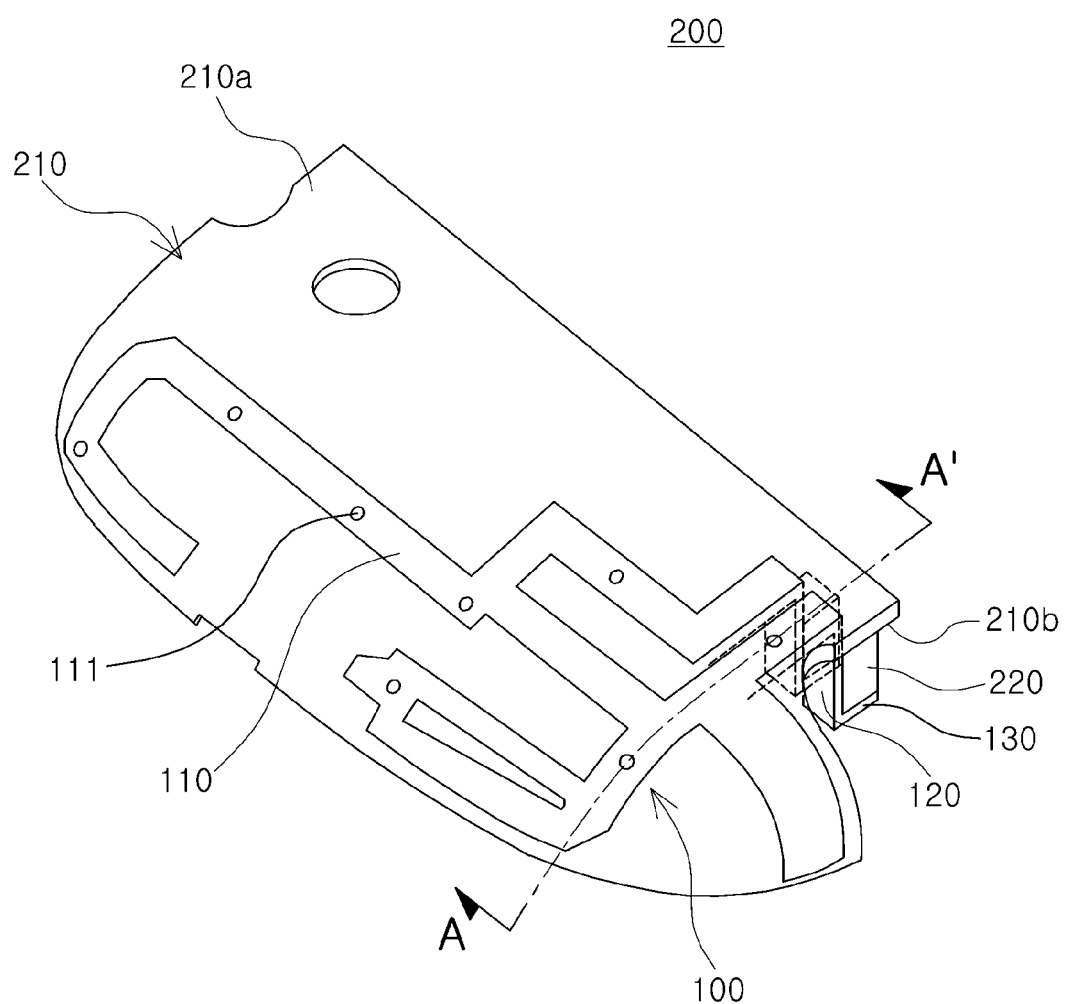
FIG. 4 is a perspective view schematically illustrating the radiator frame according to an embodiment of the present invention.
Figure 5:
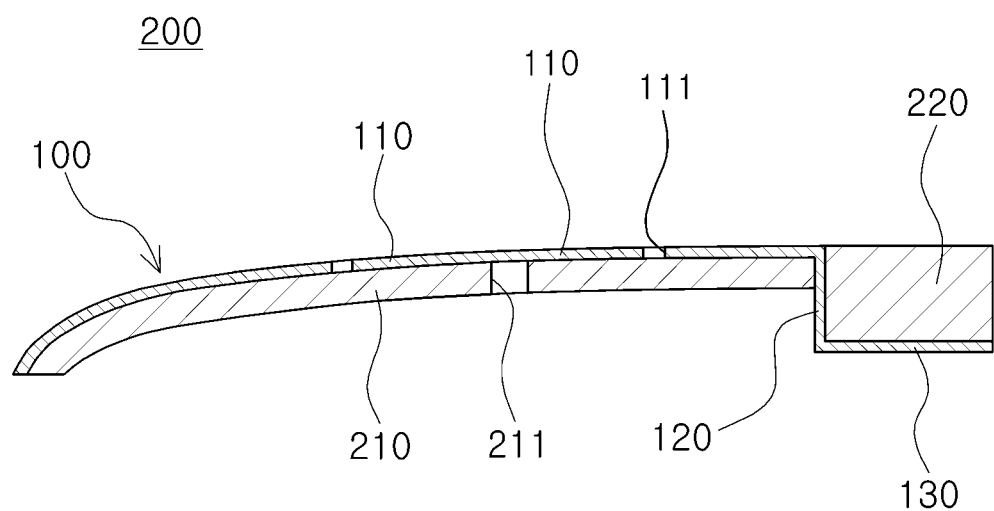
FIG. 5 is a schematic cross-sectional view taken along part A-A' of FIG. 4.
Figure 6A:
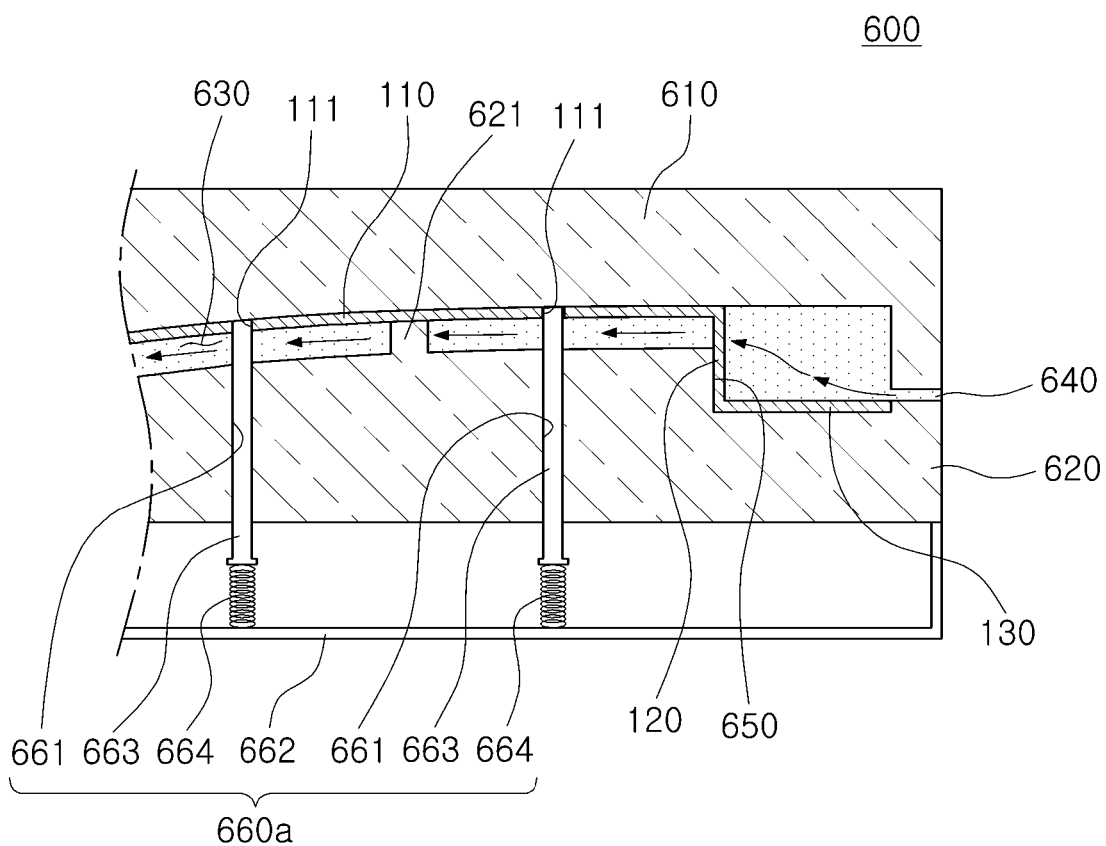
FIGS. 6A and 6B are schematic cross-sectional views illustrating forms before and after a resin material is filled in a mold for manufacturing a radiator frame according to an embodiment of the present invention.
Figure 6B:
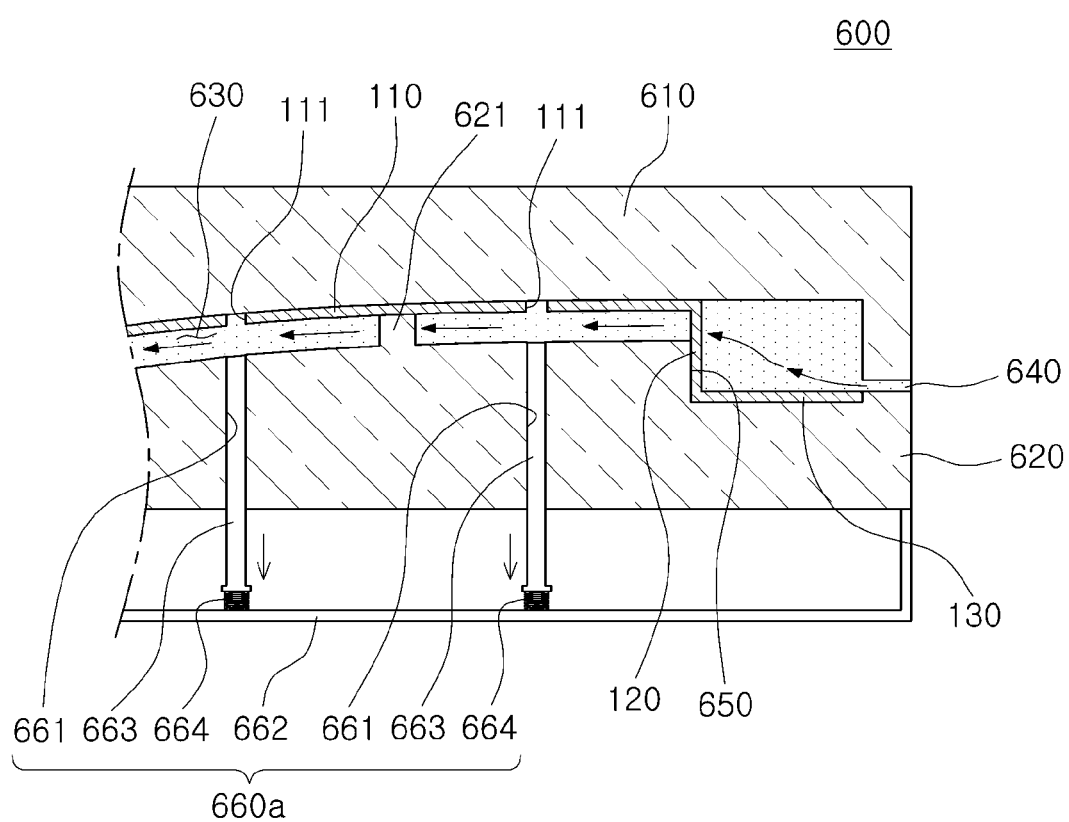
Figure 7A:
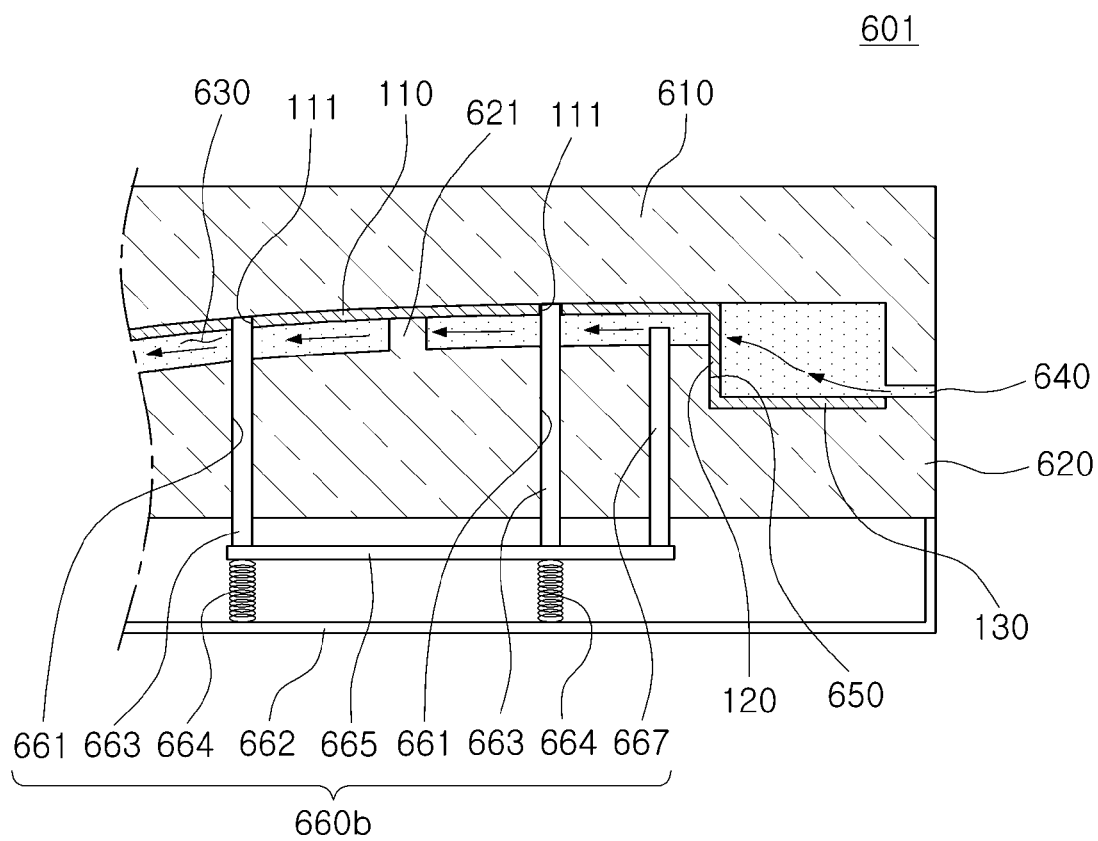
FIGS. 7A and 7B are schematic cross-sectional views illustrating forms before and after a resin material is filled in a mold for manufacturing a radiator frame according to another embodiment of the present invention.
Figure 7B:
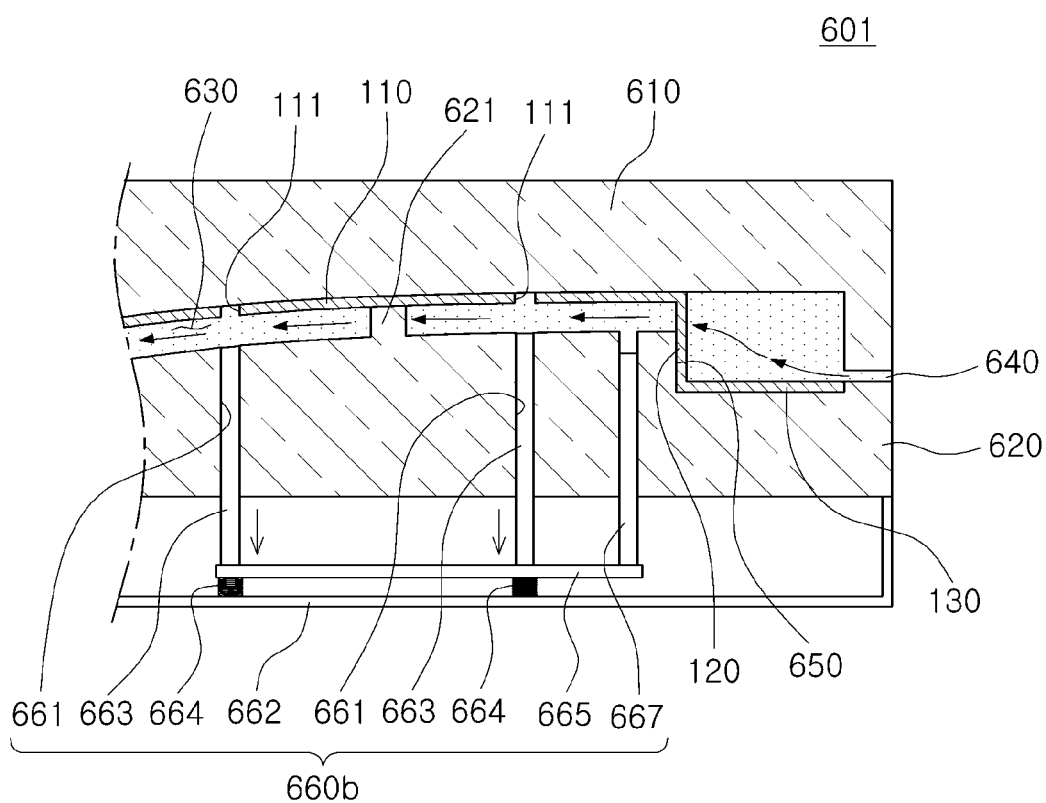
Figure 8:
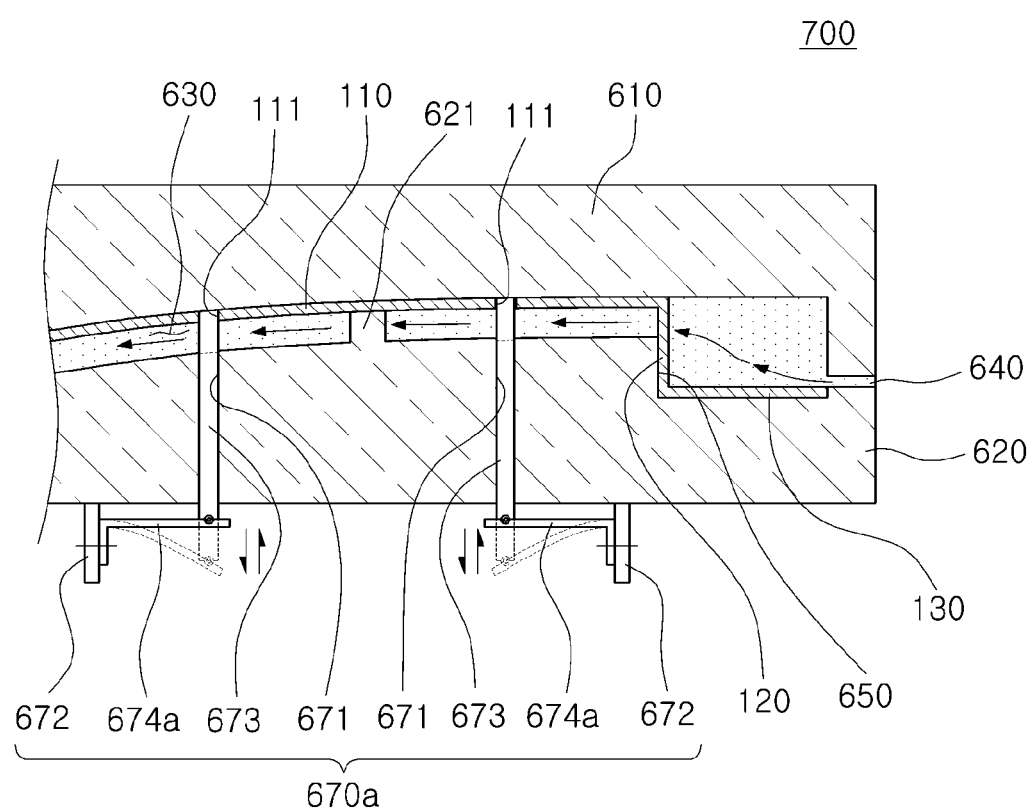
FIG. 8 is schematic cross-sectional view illustrating forms before (dotted lines) and after (solid lines) a resin material is filled in a mold for manufacturing a radiator frame according to another embodiment of the present invention.
Figure 9:
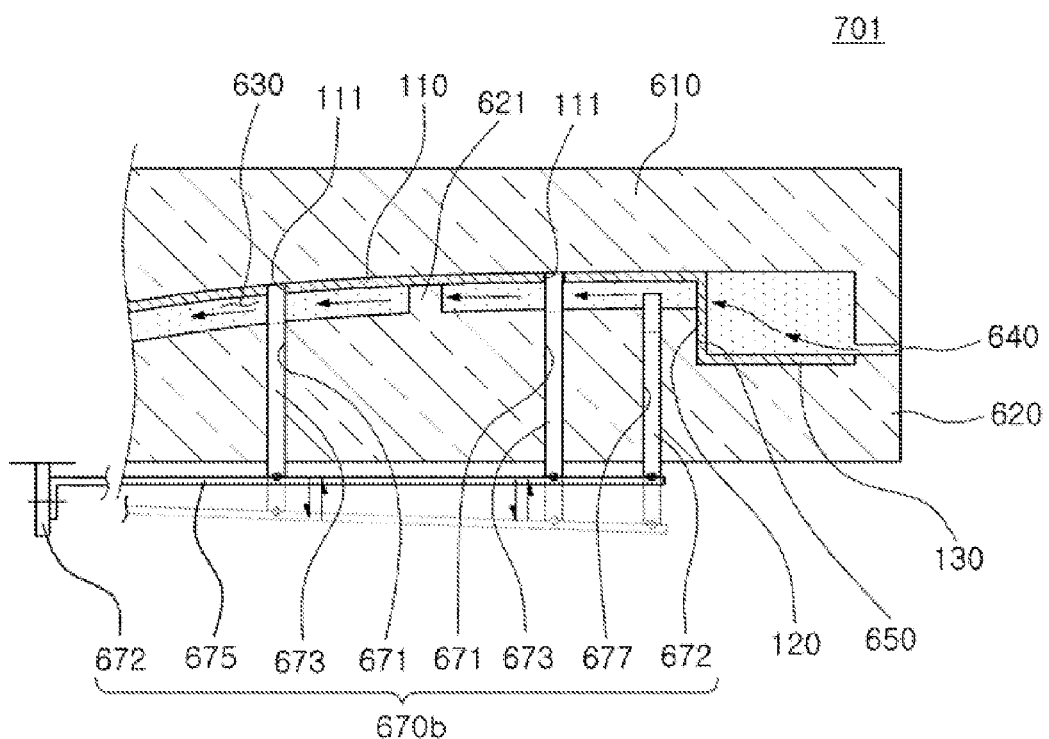
FIG. 9 is schematic cross-sectional view illustrating forms before (dotted lines) and after (solid lines) a resin material is filled in a mold for manufacturing a radiator frame according to another embodiment of the present invention.

FIG. 4 is a perspective view schematically illustrating the radiator frame according to an embodiment of the present invention, FIG. 5 is a schematic cross-sectional view taken along line A-A' of FIG. 4, FIGS. 6A and 6B are schematic cross-sectional views illustrating forms before and after a resin material is filled in a mold for manufacturing a radiator frame according to an embodiment of the present invention, FIGS. 7A and 7B are schematic cross-sectional views illustrating forms before and after a resin material is filled in a mold for manufacturing a radiator frame according to another embodiment of the present invention, FIG. 8 is schematic cross-sectional view illustrating forms before (dotted lines) and after (solid lines) a resin material is filled in a mold for manufacturing a radiator frame according to another embodiment of the present invention, and FIG. 9 is schematic cross-sectional view illustrating forms before (dotted lines) and after (solid lines) a resin material is filled in a mold for manufacturing a radiator frame according to another embodiment of the present invention.

Referring to FIGS. 4 and 5, the radiator frame 200 according to the embodiment of the present invention may include the radiator 100 and the molded frame 210.

Here, the configuration of the radiator 100 has been described in detail. Therefore, the description thereof will be omitted.

The molded frame 210 may be manufactured by injection-molding the radiator 100 and the terminal connection portion 130 may be provided so as to have elasticity. That is, when the injection-molding of the radiator 100 is complete, the terminal connection portion 130 is rotationally bent so as to be spaced apart from the molded frame 210. Thereby, since the radiator 100 is provided as an elastic body, the terminal connection portion 130 may naturally have elasticity. Besides, the structure for reinforcing the elastic force has been described in detail. Therefore, the description thereof will be omitted.

The molded frame 210 is an injection molding structure, the antenna pattern part 110 may be formed on one surface 210a of the molded frame 210, and the terminal connection portion 130 may be formed on the other surface 210b opposite to one surface 210a.

Here, the supporting holes 111 provided in the antenna pattern part 110 may be blocked by the molded frame 210 on the other surface, a direction providing the terminal connection portion 130. Further, although not shown in the drawings, the supporting holes 111 may be at least partially filled with the molded frame 210 on the other surface side.

According to the present embodiment, during the manufacturing of the radiator frame 200, the guide pins 663 or 673 fitted into the supporting holes 111 to thereby fix the antenna pattern part 110 in the mold for manufacturing the radiator frame are provided so as to be movable. That is, the guide pins 663 or 673 are fitted into the supporting holes 111 and maintain a state in which the antenna pattern part 110 is adhered to an internal surface of the mold for manufacturing the radiator frame. Thereafter, when molding resin is press-injected into an internal space 630 of the mold for manufacturing the radiator frame, the guide pins 663 or 673 may be separated from the supporting holes 111 to be retracted. As a result, all of protrusion portions of the guide pins 663 or 673 in the internal space 630 of the mold for manufacturing the radiator frame are retracted. Therefore, the radiator frame 200 according to the embodiment of the present invention has no trace of the guide pins 663 or 673 and the molded frame 210 is formed by the molding resin. Meanwhile, since the supporting holes 111 remain empty after the guide pins 663 or 673 are retracted, the supporting holes 111 may be at least partially filled with the molded frame 210 on the other surface side.

In addition, the other surface of the molded frame 210 may be provided with at least one supporting groove 211 in a position corresponding to a position in which the antenna pattern part 110 is provided. The supporting groove 211 may be formed by a supporting pin 621 provided in the mold for manufacturing the radiator frame, provided so as to support the antenna pattern part 110. That is, since the supporting pin 621 continuously supports the antenna pattern part 110 during a period in which the molding resin is completely filled into the internal space 630, when the mold for manufacturing the radiator frame is removed after the molding resin is cured, the supporting groove 211 may be formed.

Meanwhile, the guide pin 663 and the supporting pin 621 may be provided in positions different from each other in the antenna pattern part 110. That is, the guide pin 663 and the supporting pin 621 may be provided so as not to be overlapped with each other. Therefore, a portion simultaneously having the antenna pattern part 110 and the molded frame 210 may form a structure filled with at least any one of the antenna pattern part 110 and the molded frame 210 in a thickness direction thereof.

Referring to FIGS. 6A through 9, the radiator frame 200 according to the embodiment of the present invention may be manufactured by inserting the radiator 100 into an internal space 630 of the mold 600, 601, 700 or 701 for manufacturing the radiator frame and then injecting the molding resin into the internal space 630.

That is, the radiator 100 having the antenna pattern part 110 for transmitting or receiving the signal and the connecting terminal part 130 for transmitting or receiving the signal to or from the circuit substrate 500 of the electronic device, disposed on different planes thereof, is disposed in the internal space 630 of the mold 600, 601, 700 or 701 for manufacturing the radiator frame.

In this case, the mold 600, 601, 700 or 701 for manufacturing the radiator frame may have the internal space 630 in which the radiator 100 is received, wherein the internal space 630 may be generated when upper and lower molds 610 and 620 of the mold 600, 601, 700 or 701 for manufacturing the radiator frame are combined.

That is, the internal space 630 is formed when the upper mold 610 and the lower mold 620 are combined, and a groove formed in the upper mold 610 or the lower mold 620, that is, an internal surface may form the internal space 630 by the combination of the upper mold 610 and the lower mold 620.

In this case, the lower mold 620 forming the mold for manufacturing the radiator frame may be provided with a unit capable of fixing the radiator 100 disposed in the internal space 630, more specifically, the antenna pattern part 110. Hereinafter, the above-mentioned unit will be described in detail for respective embodiments.

In addition, when the upper and lower molds 610 and 620 are combined, in order for resin material to be introduced into the internal space 630, a resin material injection part 640 may be formed by a combination of any one or both of the upper mold, the lower mold, or the upper and lower molds 610 and 620.

In addition, the internal surfaces of the upper and lower molds 610 and 620 may provide a receiving groove 650 receiving the connection part 120 and the terminal connection portion 130 of the radiator 100, and the receiving groove 650 may be introduced with the resin material to fixedly support the connection part 120 and the terminal connection portion 130.

That is, since one side surface of the connection part 120 contacts with one side surface of the receiving groove 650, the resin material is filled only on one side surface of the connection part 120 to thereby form a radiator supporting part 220.

Here, the radiator supporting part 220 formed by the resin material introduced into the receiving groove 650 may be protruded from the other surface opposite to one surface on which the antenna pattern part 110 is formed.

Meanwhile, according to the present embodiment, the antenna pattern part 110 is provided with the supporting holes 111 and the supporting holes 111 are fitted with the guide pins 663 or 673, such that the antenna pattern part 110 may be fixed in the mold 600, 601, 700 or 701 for manufacturing the radiator frame.

In this case, the guide pins 663 or 673 may be provided in the lower mold 620 so that one ends thereof are fitted into the supporting holes 111 and the antenna pattern part 110 is adhered to the internal surface of the upper mold 610. Here, the guide pins 663 or 673 may be provided so as to be interworked with an elastic pushing unit 660a, 660b, 670a or 670b to be retractable by a spray pressure of the resin material introduced into the internal space 630.

That is, since the molding resin material is sprayed into the internal space 630 of the mold 600, 601, 700 or 701 for manufacturing the radiator frame at high-pressure, a pressure of the internal space 630 may be instantaneously increased. Therefore, when the guide pins 663 or 673 are provided in a structure in which they are interworked with the elastic pushing unit 660a, 660b, 670a, or 670b to be movable, the guide pins 663 or 673 may be separated and retracted from the supporting holes 111 of the antenna pattern part 110 by the high-pressure spray of the molding resin material. However, at a time at which the guide pins 663 or 673 are retracted, a significant amount of molding resin is already introduced into the internal space 630 and the antenna pattern part 110 maintains a state in which it is continuously supported by the supporting pin 621 provided in the lower mold 620, such that the antenna pattern part 110 may be molded in the molded frame 210 at a target position.

Referring to FIGS. 6A and 6B, the elastic pushing unit 660a according to the embodiment of the present invention may include an elastic unit 664 having one end attached to the other end of the guide pin 663, for example, a spring, a supporting unit 662 supporting the other end of the elastic unit 664, and a guide hole 661 provided in the lower mold 620 so that the guide pin 663 is inserted thereinto and one end thereof is exposed to the internal space 630. That is, when the molding resin is sprayed into the internal space 630 of the mold 600 for manufacturing the radiator frame at a predetermined pressure or more, the guide pin 663 may be separated from the supporting hole 111 to be retracted up to a position approximately parallel with the internal surface of the lower mold 620 (the guide pin 663 is pushed from a position of FIG. 6A to a position of FIG. 6B). Here, one or more elastic pushing units 660a may be provided.

Further, referring to FIGS. 7A and 7B, the elastic pushing unit 660b according to another embodiment of the present invention may further include a dummy guide pin 667 disposed so as to be adjacent to the resin material injection part 640 rather than to the guide pin 663, and the dummy guide pin 667 may be connected to the guide pin 663. According to the present embodiment, one end of the guide pin 663 is adhered to the internal surface of the upper mold 610. Therefore, although the high-pressure molding resin is sprayed into the internal space 630 of the mold 601 for manufacturing the radiator frame, the guide pin 663 may not be moved. Therefore, according to the present embodiment, the dummy guide pin 667 having one end spaced apart from the internal surface of the upper mold 610 by a predetermined interval may be provided at the resin material injection part 640. Since the dummy guide pin 667 has an end part, not adhered to the upper mold 610, the retraction may be easily performed even in the case in which the spray pressure of the molding resin may be reduced. Therefore, by connecting the dummy guide pin 667 to the guide pin 663 by an auxiliary plate 665, the retraction of the guide pin 663 may be easily performed based on the retraction of the dummy guide pin 667. That is, the guide pin 663 and the dummy guide pin 667 are pushed from a position of FIG. 7A to a position of FIG. 7B.

Referring to FIG. 8, the elastic pushing unit 670a according to another embodiment of the present invention may include an elastic unit 674a having one end attached to the other end of the guide pin 673, for example, an elastic plate held in a form of a cantilever, a supporting unit 672 supporting the other end of the elastic unit 674a, and a guide hole 671 provided in the lower mold 620 so that the guide pin 673 is inserted thereinto and one end thereof is exposed to the internal space 630. That is, when the molding resin is sprayed into the internal space 630 of the mold 600 for manufacturing the radiator frame at a predetermined pressure or more, the guide pin 673 may be separated from the supporting hole 111 to be retracted up to a position approximately parallel with the internal surface of the lower mold 620 (see a form in which the guide pin 673 is retracted from a position of dotted lines to a position of solid lines). Here, one or more elastic pushing units 670a may be provided.

Further, referring to FIG. 9, the elastic pushing unit 670b according to another embodiment of the present invention may further include a dummy guide pin 677 disposed so as to be adjacent to the resin material injection part 640 rather than being adjacent to the guide pin 673, and the dummy guide pin 677 may be connected to the guide pin 673. According to the present embodiment, one end of the guide pin 673 is adhered to the internal surface of the upper mold 610. Therefore, even when the high-pressure molding resin is sprayed into the internal space 630 of the mold 701 for manufacturing the radiator frame, the guide pin 673 may not be moved. Therefore, according to the present embodiment, the dummy guide pin 677 having one end spaced apart from the internal surface of the upper mold 610 by a predetermined interval may be provided at the resin material injection part 640. Since the dummy guide pin 677 has an end part not adhered to the upper mold 610, the retraction may be easily performed even when the spray pressure of the molding resin is somewhat reduced. Therefore, by connecting the dummy guide pin 677 to the guide pin 673 by an auxiliary plate 675, the retraction of the guide pin 673 may be easily performed based on the retraction of the dummy guide pin 677. That is, the guide pin 673 and the dummy guide pin 677 may be pushed from a position of dotted lines to a position of solid lines.

As set forth above, according to the embodiment of the present invention, the mold for manufacturing the radiator frame, allowing the guide hole included in the radiator to be filled with the molding resin, may be provided.

In addition, according to the embodiment of the present invention, the guide hole included in the radiator is ultimately filled with the molding resin, such that the unintended holes other than holes included in the radiator frame itself for a particular purpose may not be formed.

While the present invention has been shown and described in connection with the embodiments, it will be apparent to those skilled in the art that modifications and variations can be made without departing from the spirit and scope of the invention as defined by the appended claims.

What is claimed is:
1. A radiator frame, comprising:
a radiator including an antenna pattern part configured to transmit or receive a signal and a terminal connection portion configured to electrically connect the antenna pattern part and a circuit substrate; and
a molded frame formed by injection-molding a material to incorporate the radiator so that the terminal connection portion is exposed at a first surface of the molded frame and the antenna pattern part is exposed at a second surface of the molded frame opposite to the first surface,
wherein the antenna pattern part includes one or more supporting holes arranged to fix the antenna pattern part to an injection-molding mold, and
the supporting holes are at least partially filled with the molded frame material extending from the first surface of the molded frame.
2. The radiator frame of claim 1, wherein the first surface of the molded frame is provided with at least one supporting groove in a position corresponding to a position in which the antenna pattern part is located.
3. The radiator frame of claim 1, wherein the supporting holes are filled with the molded frame material.
4. The radiator frame of claim 1, wherein a portion of the radiator frame simultaneously having the antenna pattern part and the molded frame forms a structure filled with at least one of the antenna pattern part and the molded frame in a thickness direction.
5. The radiator frame of claim 1, wherein the antenna pattern part and the molded frame are further provided with a film formed by performing a coating or a painting process, or attaching a film or a coating paper in a direction to which the antenna pattern part is exposed.
6. An electronic device, comprising:
a case of the electronic device;
the radiator frame of claim 1 mounted in the case of the electronic device; and
a circuit substrate electrically connected to the terminal connection portion to receive a signal from or transmit a signal to the radiator.

* * * * *